United States Patent Office 3,453,511
Patented July 1, 1969

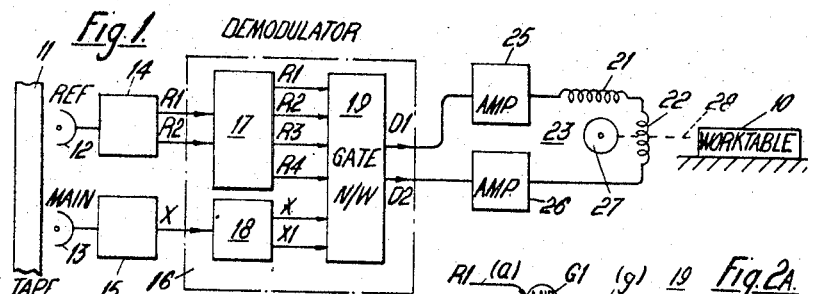
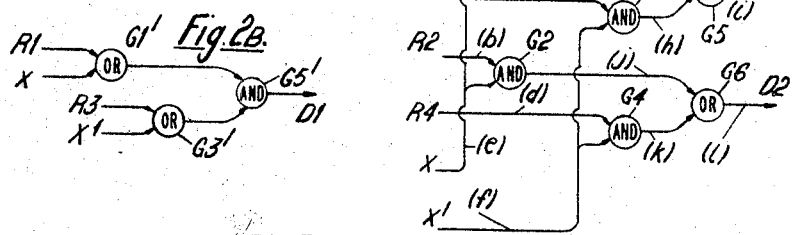
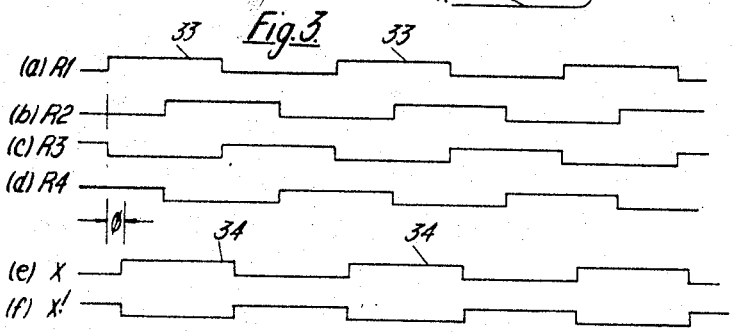
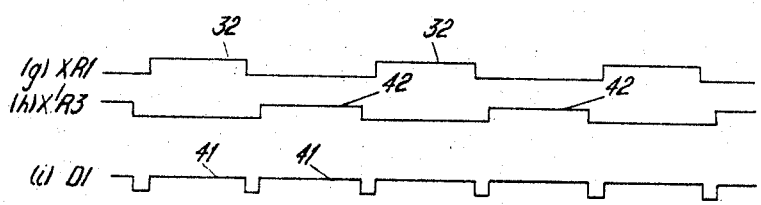
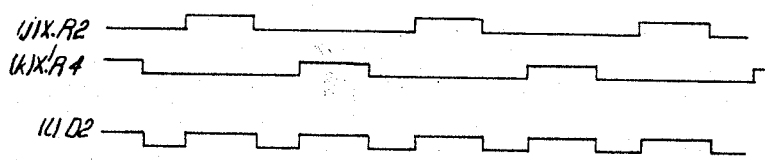
Inventors
R. S. J. GOOD
A. G. KERR
J. Y. C. MONTGOMERY
D. F. WALKER
BY Cameron, Kerkam & Sutton, Attorneys

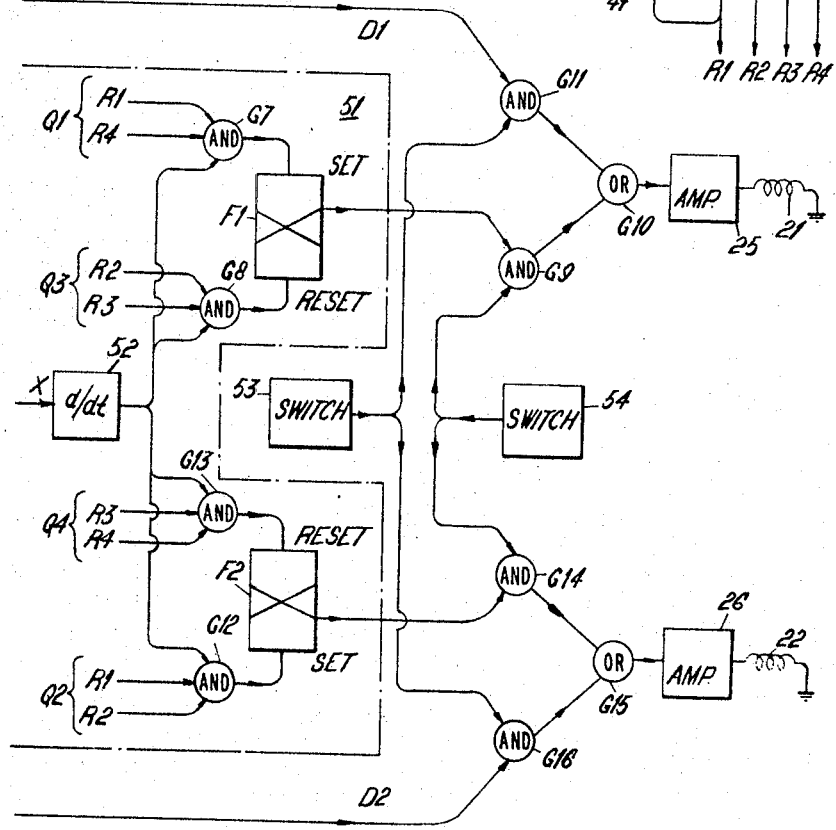

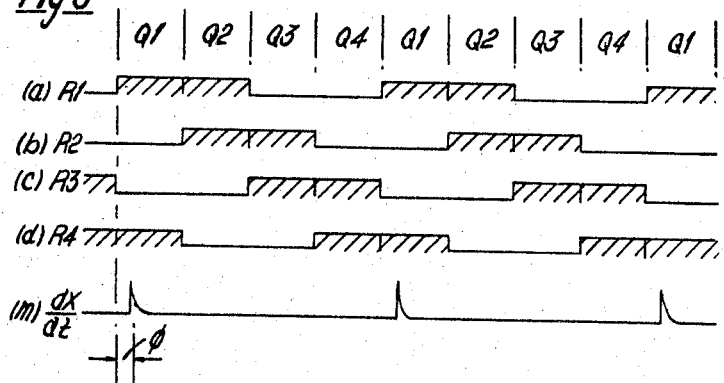
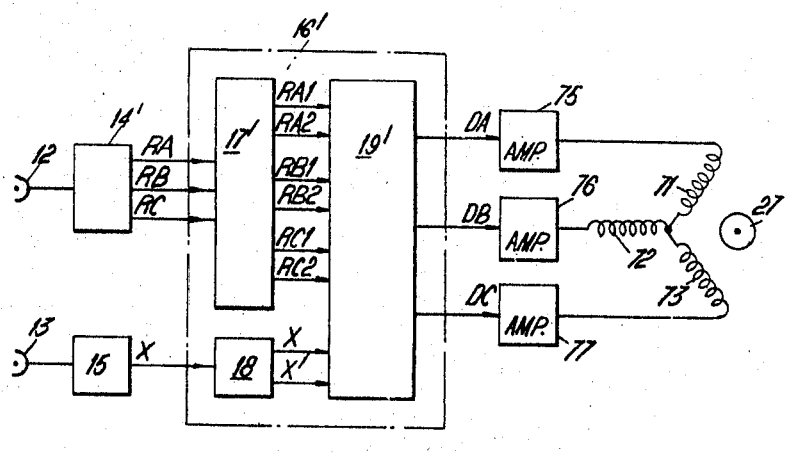
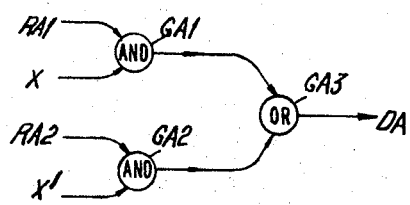
INVENTORS
R. S. J. GOOD
A. G. KERR
J. Y. C. MONTGOMERY
D. F. WALKER

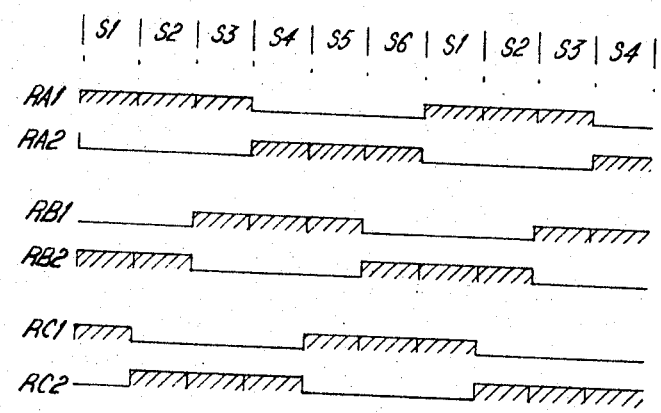
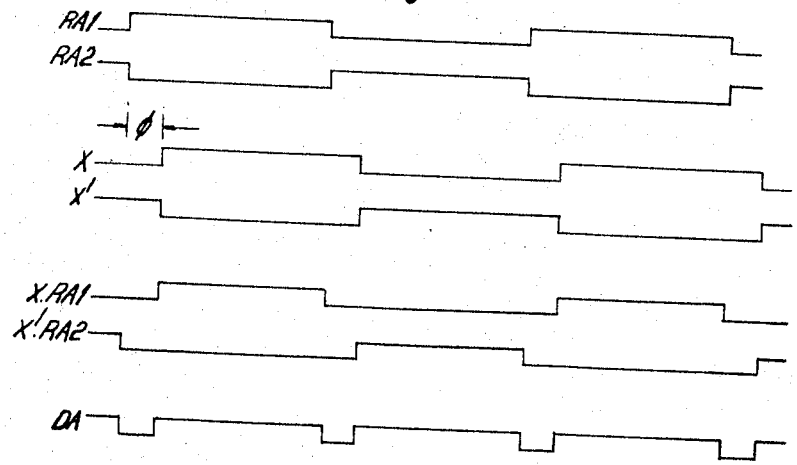

3,453,511
SERVO APPARATUS FOR CONTROLLING THE POSITION OF AN OBJECT IN DEPENDENCE OF RECORDED SIGNALS
Richard Samuel Jonathan Good, Mountsorrel, Leicester, England, and Andrew Guy Kerr, John Young Condie Montgomery, and Donald Ferguson Walker, Edinburgh, Scotland, assignors to Ferranti, Limited, Hollinwood, Lancashire, England, a company of Great Britain and Northern Ireland
Filed Jan. 11, 1966, Ser. No. 519,929
Claims priority, application Great Britain, Jan. 16, 1965, 2,059/65
Int. Cl. H02p 1/16
U.S. Cl. 318—23.5    7 Claims

ABSTRACT OF THE DISCLOSURE

Apparatus for the open-loop servo control of a machine tool employing an $n$ phase self synchronous A.C. servo motor which is dependent on recorded main and reference signals in which a unique logical gating network derives $n$ trains of rectangular signals width-modulated in $n$-phase relationship in dependence on the recorded signals and applies them to the $n$ stator phases of the self synchronous motor which follows the rotating field set up by the width-modulated information in the $n$ phase stator windings and moves the tool. By use of width-modulation, the rotating field can be slowed to zero speed and the motor will track accordingly.

This invention relates to apparatus for controlling the position of an object in dependence of the relative phase of cyclic reference and main signals in a recording medium.

The invention has particular application to the open-loop servo control of a machine tool from a magnetic tape on which the reference and main signals are recorded.

An object of the invention is to provide such apparatus in a simplified form, especially where the machine tolerances are wide enough not to require a high accuracy of positioning.

In accordance with the present invention, apparatus for controlling the position of an object in dependence on the relative phase of cyclic reference and main signals on a recording medium includes pickoff arrangements for deriving those signals in electrical form from the recording medium, means for obtaining from the derived reference signal in fixed frequency and phase relationship thereto $n$ reference squarewave signals in $n$-phase relationship with one another, means for obtaining from the derived main signal in fixed frequency and phase relationship thereto a main square-wave signal, demodulation means for deriving from the main squarewave signal under the control of the $n$ reference squarewave signals $n$ combination rectangular signals width-modulated in $n$-phase relationship with one another in dependence on said relative phase of the recorded signals, an $n$-phase synchronous motor capable of working down to zero frequency and arranged to control the position of said object, and connections for applying the $n$ combination signals to $n$-phase stator windings of the motor.

The demodulation means may include for each of the $n$ phases and And-gating means for combining the main signal with the reference signal of that phase to produce a rectangular signal, means for deriving from said rectangular signal a like rectangular signal but displaced by 180 electrical degrees, and Or-gating means for combining those two rectangular signals to produce the said combination signal of that phase.

The means for deriving a like rectangular signal may include means for deriving from the main signal and from the reference signal of that phase signals in counterphase with them, and further And-gating means for combining those counterphase signals to produce said like rectangular signal.

Also in accordance with the invention, the apparatus as set forth in the two preceding paragraphs is modified in that the And-gating means and the Or-gating means are replaced by Or-gating means and And-gating means respectively.

By a "squarewave" signal is meant a rectangular signal the lengths of successive half-cycles of which are equal.

In the accompanying drawings,

FIGURE 1 is a schematic diagram of one embodiment of the invention,

FIGURES 2a and 2b show in detail a part of the apparatus shown generally in FIGURE 1.

FIGURE 3 is a set of waveforms and FIGURE 4 a response curve to illustrate the operation of the apparatus of FIGURE 2, FIGURE 5 is a schematic diagram of apparatus for use with that of FIGURE 1 in accordance with another embodiment, FIGURE 6 is a set of waveforms to illustrate the operation of the apparatus of FIGURE 5, FIGURE 7 shows in more detail a part shown generally in FIGURE 1, FIGURE 8 is a schematic diagram of a further embodiment, FIGURE 9 shows in more detail a portion of a stage shown generally in FIGURE 8, and FIGURES 10 and 11 are further sets of waveforms to illustrate the operation.

In carrying out the invention in accordance with one form by way of example, see FIG. 1, apparatus for controlling the position of a worktable 10 of a machine tool in dependence on the relative phase of cyclic reference and main signals, recorded in sinusoidal, triangular, or squarewave form in separate tracks as intensities of magnetisation along a magnetic tape 11, includes pickoffs 12 and 13 for respectively deriving those signals in electrical form from the tape. Arrangements (not shown) are made for driving the tape past the pickoffs.

The reference signal so derived is applied to a stage 14 arranged to obtain in fixed frequency and phase relationship to that signal two reference squarewave signals R1 and R2 (in output leads so designated in the drawing) which are in two-phase relationship—that is, in quadrature—with one another.

The derived main signal is applied to a stage 15 arranged to obtain in fixed frequency and phase relationship to it a squarewave signal X in a lead so designated.

These R and X signals are applied as inputs to demodulation means in the form of a demodulation stage 16 arranged to derive from the X signal under the control of the R signals two combination rectangular signals D1 and D2 which are width-modulated in quadrature with one another in dependence on the relative phase of the recorded signals.

Stage 16 includes a stage 17 for deriving from the reference signals R1 and R2 two further reference signals R3 and R4 which are respectively in counterphase with them, and a stage 18 for similarly deriving from the main signal X a further main signal $X^1$ in counterphase with it, together with a gating network 19 which derives from signals R1, R2, R3, R4, X and $X^1$ the signals D1 and D2 in a manner to be described.

Signals D1 and D2 are applied over leads so designated to the respective quadrature windings 21 and 22 of a two-phase synchronous motor 23, by way of power amplifying stages 25 and 26 respectively. Rotor 27 of the motor is mechanically coupled, as indicated by the broken line 28, to drive the worktable 10. The motor rotor 27, which consists of a permanent magnet, aligns itself in the resultant direction of the two mutually perpendicular fields established by the currents in the $n$-phase stator windings 21 and 22, these currents being the amplified signals D1 and D2. With such a stator winding arrangementment, the rotor will follow the resultant field however slowly it rotates, i.e., down to zero frequency. Thus, when reference is made to a motor capable of working down to zero frequency it is meant a motor of the kind including a rotor capable of maintaining itself in alignment with the resultant filed set up by the relative states of energization of $n$-phase stator windings of the motor.

Before details are given of stages 14 to 19, the operation of the equipment as broadly described above will be briefly indicated.

The operation depends mainly on the fact that a width-modulated rectangular signal, such as signal D1 or D2, has a mean value which is proportional to the modulation itself. From this it follows that the original signal is recoverable by smoothing. In the arrangement of the invention, this smoothing is effected by the inductance of the motor windings 21 and 22. Hence the phase modulation of the recorded signals becomes represented at the motor by the relative strengths of the quadrature energisation of the respective windings and hence, in turn, by the angular position of the resultant field (and thus of the rotor) with respect to some angular datum defined by the motor stator. The direction of rotation is determined by which of the quadrature modulations is the leading one.

In operation, therefore, as the tape is driven past the pickoffs, the moment-by-moment phase relationship between the recorded reference and main signals at the pickoff head is converted into an angular position of the rotor 27 and hence a linear position of the worktable with respect to some datum of the tool frame. So long as the phase relationship of the recorded signals is constant, the rotor and worktable occupy constant positions. To move the table to a fresh position, the main recorded signal is displaced in phase relative to the reference signal until that position is reached. To move the table at a constant speed the recorded phase variation is made as sinusoidal as practicable along the length of the tape so as to cause the pickoffs to produce sinewave signals in quadrature with one another.

In general, whenever it is required to move the worktable according to some predetermined program, the recorded main signal is varied in a complex manner along the tape with respect to the reference signal whilst maintaining the phase relationship between them appropriate to the ratio of the component motor fields required to produce the desired orientation of the rotor and corresponding position of the workpiece instant by instant.

Stage 14 may be arranged to derive signal R1 in phase with the recorded reference signal, and signal R2 in quadrature with it. To derive the corresponding counterphase signals R3 and R4, stage 17 may include two flip-flop circuits (not shown), one triggered by signal R1 to produce at the appropriate output point the signal R3, and the other triggered by signal R2 to produce R4.

Stage 18 may comprise a single flipflop (not shown), producing signals X and $X^1$ at its respective output points.

Gating network 19 may take the form of the array of And and Or gates shown in FIG. 2A. And gates G1 and G2 constitute the And gating means for combining the main signal X with each of the two reference signals R1 and R2 to produce two rectangular signals X.R1 and X.R2 in a form to be described shortly. For this purpose signals R1 and R2 are applied as one of two inputs to gates G1 and G2 respectively, the other input of each being signal X.

The And gates G3 and G4 are the means for deriving for each of rectangular signals X.R1 and X.R2 a like signal but displaced by 180 electrical degrees. These like signals are obtained by And-gating the signal $X^1$ with signals R3 and R4 respectively, to produce signals $X^1$.R3 and $X^1$.R4.

The Or gates G5 and G6 are the Or-gating means for combining each of trains X.R1 and X.R2 with the corresponding 180 degree displaced signal $X^1$.R3 or X.R4, as the case may be, to produce the two combination signals D1 and D2.

The manner in which the gates operate and the nature of the signals derived from them may best be understood from the following description of their operation, with reference to the voltage waveforms of FIG. 3. All these waves are of the rectangular kind, each consisting of portions which may be designated more-positive and more-negative and which follow one another alternately. For ease of reference these portions will be referred to simply as the positive and the negative portions, on the assumption that the zero voltage line transects each wave. It should however be understood that the zero line may be wholly above or wholly below the wave, with the result that both portions are negative or both positive, as the case may be.

From $a$ to $d$ are shown the reference signals R1 to R4, with R2 in quadrature with R1 and with R3 and R4 in counterphase with R1 and R2 respectively.

Waveform $e$ is that of the main signal X displaced in phase with respect to signal R1 by the angle $\phi$, which represents the desired positions of rotor 27 and worktable 10 at the particular moment which the waveforms illustrate. Signal $X^1$, in counterphase with X, is shown at $f$.

Gate G1 receives as inputs the signals R1 and X (waves $a$ and $e$) and derives from them the signal X.R1 such that its positive portions 32—see wave $g$—are the result of And-gating the positive half-cycles 33 and 34 of the component squarewave signals R1 and X.

To derive for signal X.R1 the like signal displaced from it by 180 degrees, gate G3 similarly And-gates signals $X^1$ and R3, to produce $X^1$.R3 in the form shown at $h$.

Gate G5 combines signals X.R1 and $X^1$.R3 by Or-gating them, thereby producing signal D1 in the form shown at $i$. As with the And gates G1 to G4, Or-gate G5 is concerned with the positive portions of the signals; thus the positive portions 41 of signal D1 are the result of Or-gating the positive portions 32 and 42 of signals X.R1 and $X^1$.R3.

In a similar manner, gates G2, G4, and G6 derive signal D2 from signals X.R2 and $X^1$.R4 as shown in waveforms $j$, $k$, and $l$.

As already indicated, signals D1 and D2 represent the modulation, and hence define the angular position of the rotor, by the relative values of their mean levels. As shown in FIG. 4, the mean value of D1 varies in triangular fashion from a positive maximum when $\phi$ is zero through zero when $\phi$ is 90° to a negative maximum when $\phi$ is 180°. D2 has a similar waveform but displaced by 90°. At the moment depicted by the waveforms of FIGS. 3 and 4, it will be seen that the value of signal D1, as smoothed by winding 21, is appreciably greater than that of signal D2, as smoothed by winding 22; consequently the corresponding position of the rotor 27 is with the field more nearly in alignment with the field of winding 21 than with the field of winding 22. This position of the rotor represents the particular phase relationship $\phi$ between the recorded signals at that moment.

Where convenient, the demodulation stage 16 may be extended by further gates to derive by the appropriate recombination of the R and X signals further combination signals D3 and D4 in counterphase with signals D1 and D2 respectively. Thus signal D3 may be derived by first And-gating signals X and R3, and signals $X^1$ and R1, and producing signal D3 by Or-gating those combinations. Similarly with signal D4. Signals D1 and D3 are then applied to amplifier 25 in push-pull, and signals D2 and D4 in push-pull to amplifier 26.

As in either arrangement amplifiers 25 and 26 are pulse-driven, they may conveniently be operated in a Class C mode to provide greater economy of working.

For each movement of the worktable along another coordinate the apparatus of the invention may be repeated. The tape requires an additional main signal for each such extra direction, but the existing reference signal may be common to them all.

It has been found in practice that the invention may be used with advantage where machining tolerances are of the order of 0.005 inch or more. Serious errors can only arise where the motor falls out of step with the tape signals to the extent of one or more complete revolutions. As this is very seldom experienced the need for deriving signals to represent the actual position of the worktable and feeding them back to compare them with the command signals of the tape is rendered unnecessary, and the absence of the equipment for thus closing the servo loop renders the apparatus of the invention comparatively inexpensive.

In an alternative arrangement, the And and Or gates may reverse their functions—the "And" becoming "Or," and the "Or" becoming "And." The effect of this is merely to shift the D triangular waveforms through 180°. Thus as shown in FIG. 2B, the And gates G1 and G3 of FIG. 2A are replaced by Or gates $G1^1$ and $G3^1$, and Or gate G5 by an And gate $G5^1$. Similarly with the gates for signals R2 and R4.

In another alternative, applicable to either arrangement, the gates may be such as to respond to the negative portions of the input signals, rather than to the positive portions as described.

Further, it is not essential that the signal polarity which is passed by the gates should be the same throughout. Thus if the part of the waveform that is passed by And gates G1 to G4 was the positive part, and the signal thus passed was reversed in polarity—for, say, convenience of circuit construction—the apparatus would still operate satisfactorily provided that gates G5 and G6 were made And gates too.

It is usually desirable to make arrangements for keeping track of the value of the phase-shift angle $\phi$ at every instant, so that if the tape drive should be arrested for any reason, and in consequence the derived signals cease, the outputs from the demodulating stage 16 become replaced by signals of fixed value which clamp the rotor 27 in a datum position in or adjacent to the angular quadrant it had reached in response to the value of $\phi$ just before the tape drive had ceased. Thus when the tape drive is resumed, the worktable movement is carried on from approximately the point where it had ceased.

This purpose is conveniently effected by a logic stage arranged to generate the clamping signals in such dependence on the derived signals as to define four discrete angular positions of the rotor at approximately 90 degree spacings, some sort of switching means being provided to effect the substitution of the clamping signals for the signals D1 and D2 whenever the tape drive ceases, thereby clamping the rotor close to the position reached immediately before such substitution. Suitable arrangements will now be described with reference to FIG. 5.

The logic stage 51 includes a bistable stage or flipflop F1 arranged to be switched to its Set state by the output from a three-entry And gate G7. Two of the inputs to the gate are the signals R1 and R4, conveniently supplied by connections from the corresponding leads between stages 17 and 19 (see FIG. 1). The third input is a train of positive pulses coincident with the leading edges of the positive half-cycles 34 of signal X—see FIG. 3a—obtained by differentiation in a stage 52. The stage is switched to its Reset state by the output from another And gate G8 having as inputs signals R2 and R3 and the X pulses.

The output from stage F1 is applied to field winding 21 of the motor by way of a two-entry And gate G9, and Or gate G10, and amplifier 25. Signal D1 is applied to that winding by way of a two-entry And gate G11 and Or gate G10. The other inputs to gates G11 and G9 are derived from two switching stages 53 and 54 respectively.

Closely similar arrangements are made for the other field winding 22. Here a flip-flop F2 is Set by signals R1 and R2, by way of a gate G12, and Reset by R3 and R4 by way of a gate G13, in each case in conjunction with the X pulses. The output from stage F2 is applied to winding 22 by way of an And gate G14, controlled by stage 54, an Or gate G15, and amplifier 26, with signal D2 applied by way of an And gate G16, controlled by stage 53, and Or gate G15.

The switching stages 53 and 54 merely determine whether the motor is energised by signals D1 and D2 or by the clamping signals from stages F1 and F2. To apply signals D1 and D2 to the motor, stage 53 biases gates G11 and G16 to the open condition whilst stage 54 maintains gates G9 and G14 closed. To apply the clamping signals, gates G9 and G14 are biased open whereas gates G11 and G16 are kept closed against signals D1 and D2.

Stages 53 and 54 may be arranged to be actuated at will. Alternatively, they may be arranged to be actuated automatically in dependence on the tape drive so as to substitute the clamping signals for signals D1 and D2 whenever the drive ceases. In the ensuing description it will be assumed for convenience that stages 53 and 54 are applying the clamping signals to the motor.

As with the network of FIG. 2, it will be assumed that all the gates of FIG. 5 respond to the positive portions of the signals.

It will be seen from waveforms $a$ to $d$ of FIG. 3 that each cycle of the original reference signal R1 may be divided into four equal quadrants defined by the overlaps of the positive portions of signals R1 and R4, R1 and R2, R2 and R3, and R3 and R4, respectively. These four signal waveforms are redrawn in FIG. 6, with the quadrants indicated by the references Q1 to Q4 and with the positive X pulses shown in waveform $m$ for the same value of $\phi$ as in FIG. 3.

Reverting to FIG. 5, where the quadrant combinations of the reference numbers are again indicated, each X pulse Sets or Resets stage F1 or F2 depending on which of the quadrants Q1 to Q4 contains the pulse. Thus with $\phi$ having the value shown, each X pulse occurs during quadrant Q1 in which the two overlapping positive portions are those of signals R1 and R4. The pulse accordingly passes through gate G7 to operate stage F1 to its Set condition. With $\phi$ increased by about 90 degrees, so that the X pulses are in quadrant Q2 (R1 and R2) the pulse operates stage F2 to its Set condition. Similarly with the X pulses in quadrant Q3 or Q4; stage F1 or stage F2, as the case may be, is thereby Reset.

The four quadrants are those also represented by the respective conditions of stages F1 and F2, the outputs from which constitute the clamping signals that establish by the appropriate energisation of the stator windings the four conditions of the stator field required to clamp the rotor adjacent to the angular position it occupied when signals D1 and D7 were last effective. Convenient values for these signals may be +12 volts or −12 volts according to whether the stage (F1 or F2) is Set or Reset.

With each X pulse occurring in quadrant Q1, then, stage F1 is Set and F2 Reset, and windings 21 and 22 are accordingly energised at +12 volts and −12 volts respectively. As this condition corresponds to values of $\phi$ between 0 and 90 degrees, the angular position in which the rotor is clamped by the field thus established may for convenience be referred to as 0 degrees.

Where the quadrant is Q3, these polarities are reversed, thereby establishing a field which clamps the rotor in a position reversed from that defined by quadrant Q1 and which may accordingly be referred to as 180 degrees.

Where the equadrant is Q2, both windings are energised at +12 volts, thereby clamping the rotor at 90 degrees.

Where the quadrant is Q4, both windings are energised at −12 volts, thereby clamping the rotor at 270 degrees.

Signals defining four discrete angular positions of the rotor are thus generated by logical stage 51 in dependence on the derived signal, the arrangements for substituting these clamping signals for the outputs from the demodulating stage 16 being constituted by the switching stages 53 and 54 and the gates they control.

In operation, the clamping signals are generated by stage 51 even when the tape drive is functioning and the control of the motor is being exercised by signals D1 and D2. As the value of $\phi$ passes from quadrant to quadrant, the flipflops F1 and F2 are switched accordingly, but their outputs are blocked by gates G9 and G14, which are maintained closed by stage 54 whilst stage 53 holds gates G11 and G16 open. As soon as the tape drive ceases, those gates are changed over, with the result that the clamping signals take over the control.

The gates of stage 51 may alternatively be negative responsive; in which case the polarities of the clamping signals require to be reversed if the clamped positions of the rotor are to be as before.

Stages 14 and 17 may alternatively be combined as shown in FIG. 7.

A free-running multivibrator oscillator 61 is designed to generate a square-wave signal at four times the reference signal frequency $f$ defined by the speed of the tape drive. This signal is applied to a divide-by-four circuit 62 which supplies over its four output leads the signals R1 to R4. To ensure that these signals have the tape frequency $f$, one of them—R1, as in the drawing—is fed back for comparison in a stage 63 with the signal from the tape. The output from this comparator is applied to multivibrator 61 to lock it to the frequency $4f$ to a sufficient degree of accuracy.

Where the motor is of the three-phase synchronous kind, the arrangement of FIG. 1 may be modified as shown in FIG. 8 with the three stator windings indicated at 71, 72, and 73. Like components are here given their previous references, whilst components that correspond to those of FIG. 1 but are of somewhat dissimilar construction are given the previous references primed.

The reference signal derived from pickoff 12 is converted to three-phase form in stage 14$^1$, which may take the form of any convenient phase conversion network. The three-phase signals RA, RB, and RC are delivered over leads so designated to demodulator 16$^1$. In stages 17$^1$ of the demodulator, each signal is provided with a signal in counterphase with it, the corresponding pairs of signals being designated RA1, RA2; RB1, RB2; RC1, RC2. These signals are applied to a gating network 19$^1$ together with the main signals X and X1 derived by pickoff 13 and stages 15 and 18 exactly as before.

Network 19$^1$ is very similar to that of FIG. 2. As shown for phase A in FIG. 9, signals RA1 and X are added at gate GA1, whilst the counterphase signals RA2 and X$^1$ are added at gate GA2. The outputs from these gates are applied by way of an Or gate GA3 to the phase output line DA.

The corresponding waveforms are shown in FIG. 10, with $\phi$ having about the same value as in FIG. 3. The resulting combination rectangular signal DA has therefore a simliar waveform to that of signal D1.

The remaining two phase signals DB and DC are derived in a similar manner. Amplifiers 75 to 77 are provided as before in the leads in the respective windings.

Clamping signals may be derived in manner similar to that described above with reference to FIG. 5. As shown by the waveforms of FIG. 11, the existence of the six reference signals allows the definition of six angular sectors for the rotor, in place of the four quadrants of the embodiment first described. These sectors are indicated by the references S1 to S6. Sector S1 is defined by the overlaps of the positive portions of signals RA1, RB2, and RC1; sector S2 by signals RA1, RB2, and RC2; and so on.

The logic stage may therefore be closely similar to stage 51 of FIG. 5. This time, however, there are three flipflop stages instead of two, providing the necessary six clamping signals. Each flipflop is controlled by way of four-entry And gates the input to each of which is supplied by the X pulse and the appropriate three reference signals. The changeover arrangements controlled by switching stages S1 and S2 are also much as before, but with a third set of gates for the third winding.

What we claim is:

1. Apparatus for controlling the position of an object in dependence on the relative phase of cyclic reference and main signals on a recording medium including pick-off arrangements for deriving those signals in electrical form from the recording medium, means for obtaining from the derived reference signal in fixed frequency and phase relationship thereto $n$ reference squarewave signals in $n$-phase relationship with one another, means for obtaining from the derived main signal in fixed frequency and phase relationship thereto a main squarewave signal, demodulating means for deriving from the main squarewave signal under the control of the $n$ reference squarewave signals $n$ combination rectangular signals width-modulated in $n$-phase relationship with one another in dependence on said relative phase of the recorded signals, an $n$-phase synchronous motor including a rotor capable of maintaining itself in alignment with the resultant field set up by the relative states of energization of $n$-phase stator windings of the motor and arranged to control the position of said object, and connections for applying the $n$ combination signals to the $n$-phase stator windings.

2. Apparatus as claimed in claim 1 wherein the demodulating means include for each of the $n$ phases And-gating means for combining the main signal with the reference signal of that phase to produce a rectangular signal, means for deriving from said rectangular signal a like rectangular signal but displaced by 180 electrical degrees, and Or-gating means for combining those two rectangular signals to produce the said combination signal of that phase.

3. Apparatus as claimed in claim 2 wherein the means for deriving a like rectangular signal include means for deriving from the main signal and from the reference signal of that phase signals in counterphase with them, and further And-gating means for combining those counterphase signals to produce said like rectangular signal.

4. Apparatus as claimed in claim 1 wherein the demodulating means include for each of the $n$ phases Or-gating means for combining the main signal with the reference signal of that phase to produce a rectangular signal, means for deriving from said rectangular signal a like rectangular signal but displaced by 180 electrical degrees, and And-gating means for combining those two rectangular signals to produce the said combination signal of that phase.

5. Apparatus as claimed in claim 4 wherein the means for deriving a like rectangular signal include means for deriving from the main signal and from the reference signal of that phase signals in counterphase with them, and further Or-gating means for combining those counterphase signals to produce said like rectangular signal.

6. Apparatus as claimed in claim 1 including a logic stage for generating in dependence on the derived signals $n$ clamping signals to define $n$ discrete angular positions of the rotor of the motor, and arrangements for substituting the clamping signals for the output from the demodulating means so that on the cessation of the derived signals the rotor is maintained in the vicinity of the angular position reached immediately before the substitution.

7. Apparatus as claimed in claim 6 wherein the logic stage is arranged to derive the clamping signals in dependence on combinations of the main signal with $n$ different combinations of the reference squarewave signals and signals in counterphase with them.

References Cited

UNITED STATES PATENTS 2,937,365  5/1960  Peaslee.
3,117,268  1/1964  Madsen _____ 310—49 X ORIS L. RADER, *Primary Examiner.*

THOMAS E. LYNCH, *Assistant Examiner.*

U.S. Cl. X.R.

318—18, 162